Oct. 10, 1950     W. C. AKERS     2,525,631
TWINE LIFTER
Filed May 1, 1946
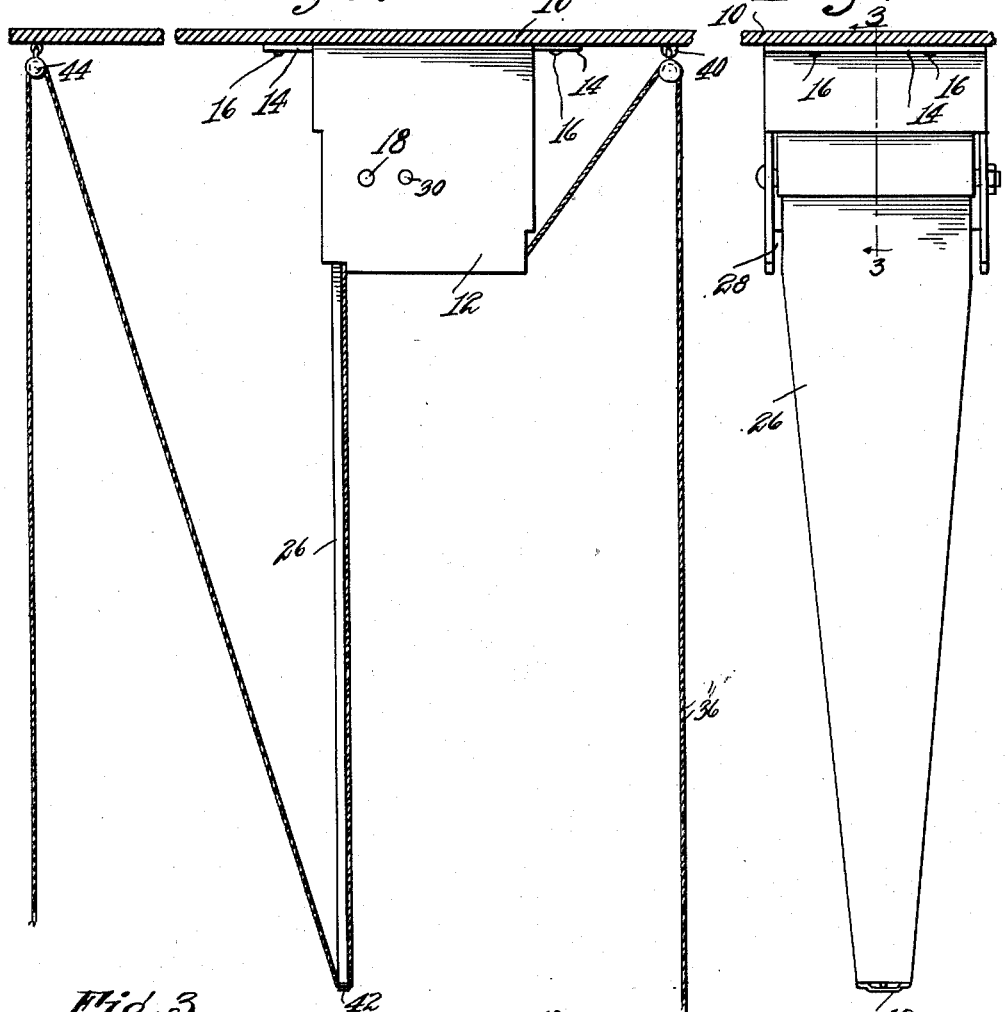
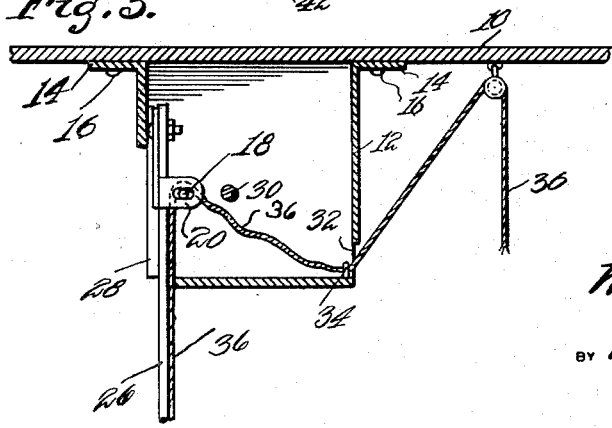
INVENTOR.
Walter C. Akers.
BY Victor J. Evans & Co.
ATTORNEYS Patented Oct. 10, 1950

2,525,631

UNITED STATES PATENT OFFICE 2,525,631

TWINE LIFTER

Walter C. Akers, North Matewan, W. Va.

Application May 1, 1946, Serial No. 666,412

1 Claim. (Cl. 242—144)

This invention relates to a twine lifter which will permit twine to be supported at any suitable point within convenient reach of the user thereof, and will after the removal of a portion thereof take up any slack remaining therein.

The principal object of the invention is to lift the twine out of the way while it is not being used.

Another object of the invention is to provide a lifter that will supply a tension on the twine and thus maintain the twine in proper position for the use thereof.

A further object of the invention is to provide a device that is simple in operation and construction, and can be inexpensively manufactured.

With the above and other objects in view, the invention consists of the novel details of construction, arrangement and combination of parts more fully hereinafter described, claimed and illustrated in the accompanying drawing in which:

Figure 1 is a side elevational view of an embodiment of the invention;

Figure 2 is a rear view thereof, and

Figure 3 is a sectional view on the line 3—3 of Figure 2.

Referring more in detail to the drawing, the reference numeral 10 designates a portion of the ceiling of a room to which an embodiment of the invention is adapted to be secured.

The twine lifter comprises a box 12 provided with lateral flanges 14 which are adapted to be secured to the ceiling 10 by fasteners 16.

A shaft 18 is journalled transversely of the box 12 and on the shaft 18 is pivotally mounted by means of elongated hinges 20, for sliding oscillating movement on the shaft, a depending arm 26. The arm 26 depends below the box 12 emerging therefrom by means of the opening 28 formed therein. Journalled transversely of the box 12 in parallel spaced relation to the shaft 18 is a second shaft 30, and in opposed relation to the opening 28 is a second opening 32 having an eye 34 mounted in the box 12 at the center thereof.

In operation, the box 12 is fastened to the ceiling 10 by fasteners 16, then the twine 36 from a supply not shown is trained over an eye 40 secured to the ceiling 10 adjacent the box 12. From the eye 40, the twine is passed through eye 34 under shaft 30 over shaft 18 between the arm 26 and the shaft. The twine then extends downwardly in parallel relation to the arm, to pass through the eye 42 on the end of the arm, then upwardly over eye 44 to hang in convenient reach of the user. As the twine is pulled, the arm contacting the shaft 18 tensions or brakes the twine so that the arm will be raised without pulling the twine from the supply thereof. When the upper end of the arm strikes the fulcrum shaft 30, the hinges 20 permit the arm to move away from the shaft 18 and release the twine, permitting the twine to be pulled free. Upon release of the twine, the arm will again by means of the hinges cause the twine to contact shaft 18 and be clamped between the arm and shaft 18. The arm will therefore in its downward movement by gravitational action, pull the string upward from the counter to its former position, where it can be easily grasped, but is out of the way.

From the foregoing description, it is believed that the operation and construction of the invention will be apparent to those skilled in the art, and it is to be understood that changes in the details of construction, arrangement and combination of parts may be resorted to, provided they fall within the spirit of the invention and the scope of the appended claim.

Having thus described the invention, what is claimed as new and desired to be secured by Letters Patent is:

A device of the character described, comprising a container, means for supporting said container on the ceiling of a room, a pivot shaft in said container mounted transversely thereof, an arm, means on said arm for mounting said arm on said pivot shaft for sliding oscillating movement thereon and said arm depending downwardly through an opening formed in said container, a second shaft mounted in said container transversely thereof in spaced parallel relation with said first shaft, and twine passing through the container and tensioned between said arm and said pivot shaft will when greater tension is applied to the free end of the twine cause said arm to be moved on the pivot shaft until the upper end of said arm will engage said second shaft whereby said arm will be raised out of engagement with said pivot shaft to release the arm from engagement with the twine to permit said twine to be withdrawn from said container.

WALTER C. AKERS.

REFERENCES CITED

The following references are of record in the file of this patent:

UNITED STATES PATENTS

| Number | Name | Date |
|---|---|---|
| 939,233 | Eastman | Nov. 9, 1909 |
| 1,046,877 | Shull | Dec. 10, 1912 |